United States Patent [19]

Hallden-Abberton

[11] Patent Number: 5,276,090
[45] Date of Patent: Jan. 4, 1994

[54] GRAFT COPOLYMERS OF POLYGLUTARIMIDES AND AROMATIC POLYESTERS

[75] Inventor: Michael P. Hallden-Abberton, Maple Glen, Pa.

[73] Assignee: Rohm and Haas Company, Philadelphia, Pa.

[21] Appl. No.: 6,887

[22] Filed: Jan. 21, 1993

Related U.S. Application Data

[62] Division of Ser. No. 658,928, Feb. 21, 1991, Pat. No. 5,223,578.

[51] Int. Cl.$^5$ .................... C08L 33/24; C08L 67/02
[52] U.S. Cl. ........................................ 525/69; 525/64; 525/65; 525/66; 525/67; 525/68
[58] Field of Search ................ 525/69, 64, 65, 66, 525/67, 68

[56] References Cited

U.S. PATENT DOCUMENTS

| | | | |
|---|---|---|---|
| 4,246,374 | 1/1981 | Kopchik | 525/329 |
| 4,727,117 | 2/1988 | Hallden-Abberton et al. | 525/343 |
| 5,048,517 | 1/1992 | Hallden-Abberton | 525/183 |

FOREIGN PATENT DOCUMENTS

| | | |
|---|---|---|
| 368163A2 | 5/1960 | European Pat. Off. . |
| 373610A2 | 6/1990 | European Pat. Off. . |
| 438239A2 | 1/1991 | European Pat. Off. . |
| 59-41355 | 3/1984 | Japan . |

OTHER PUBLICATIONS

Preparation of Alloys and Blends from XHTA Polymers, Rohm and Haas Company, May 23, 1985, pp. 15–16.

Primary Examiner—Patricia A. Short
Attorney, Agent, or Firm—Roger K. Graham

[57] ABSTRACT

Polymers containing glutarimide units and also acid and/or anhydride units are compatible with polyesters, such as poly(ethylene terephthalate) to form blends. Chemical interaction (grafting) between the polyester and the acid/anhydride groups of the polyglutarimide occurs on processing the blends. The extent of grafting and the properties of the resultant blend can be enhanced by appropriate catalyst.

16 Claims, No Drawings

GRAFT COPOLYMERS OF POLYGLUTARIMIDES AND AROMATIC POLYESTERS

This is a divisional of application Ser. No. 658,928, filed Feb. 21, 1991, now U.S. Pat. No. 5,223,578.

FIELD OF THE INVENTION

This invention relates to polyester-grafted polyglutarimide ionomers, a process for preparing the ionomers, and blends of the ionomers with other polar polymers.

BACKGROUND OF THE INVENTION

Polyglutarimides are polymers containing units of the structure:

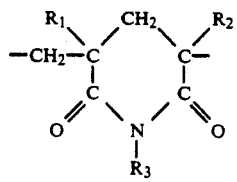

where $R_1$ and $R_2$ are H or $CH_3$ and $R_3$ is hydrogen, alkyl, cycloalkyl, substituted alkyl, substituted cycloalkyl, aryl, substituted aryl, alkaryl, substituted alkaryl, aralkyl, substituted aralkyl, or heterocyclic. Polyglutarimides (especially those polyglutarimides were $R_1$ and $R_2$ are $CH_3$ and $R_3$ is H or methyl), are useful thermoplastics, exhibiting thermal stability, moldability, clarity, low color, reasonable toughness, and good barrier properties. It has further been known that such polyglutarimides, especially those where acid or anhydride groups present in the polyglutarimide are reacted with an alkylating or esterifying agent to reduce the acid/anhydride content to levels of about 0.5 weight percent or less, are compatible with a broad variety of polar thermoplastics, as well as serving as compatibilizers for blends of many polar polymers. Among the polar polymers are included polyesters, especially aromatic polyesters, by which is meant the polymer formed by condensation of an aliphatic glycol with an aromatic acid, such as poly(ethylene glycol) terephthalate, commonly known as poly(ethylene terephthalate), poly(butylene terephthalate), and the like.

It has more recently been found than in the blending of polyglutarimides with polar polymers having reactive terminal or pendant groups, such as amine or primary hydroxyl, that grafting occurs, probably at residual acid or anhydride groups in the polyglutarimide. For this reason, polyglutarimides maintaining all or part of the acid/anhydride groups are preferred for such blending/grafting. Blends of polyesters, such as poly(ethylene terephthalate), with a polyglutarimide where the content of acid and/or anhydride has been substantially reduced, do not appear to be chemically attached or grafted in the absence of a catalyst.

Even more recently, it has been discovered that the extent of reaction between a polyglutarimide containing a preponderance of units of the glutarimide structure where $R_1=R_2=R_3=$methyl and about 5 weight percent of units derived from methacrylic acid or from methacrylic anhydride with a polyamide such as polycaprolactam may be increased by the presence of small amounts of a basic catalyst, such as sodium hydroxide.

The catalysts of the reaction between hydroxylic groups in a polyester and the acid/anhydride sites in a polyglutarimide is not known to the art, nor it is obvious that a catalyst useful with polyamides in the melt would also be useful with polyesters. It is further not obvious that the resulting graft copolymer formed in higher yield will impart improved performance to the blend of graft copolymer and remaining unreacted polyester and polyglutarimide.

DETAILED DESCRIPTION OF THE INVENTION

The graft copolymer of the present invention differs from a graft copolymer formed by a non-catalyzed grafting process. In the non-catalyzed reaction at an anhydride function, there may be present an unreacted carboxylic acid group. In the catalyzed reaction, there will have been present some acid groups, either present originally or formed from the anhydride ring-opening reaction, which have been neutralized by the catalyst involved to form ionomeric groups, that is, partially neutralized acid groups attached to a polymer chain. Thus, the graft copolymer of the present invention may be described as a polyester-grafted poly(glutarimide) ionomer containing units of the structures:

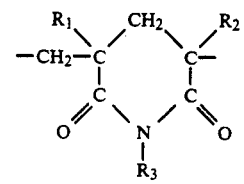

wherein $R_1$ and $R_2$ are H or $CH_3$, and $R_3$ is H, $C_1$–$C_{20}$ alkyl, substituted alkyl, $C_3$–$C_8$ cycloalkyl, substituted cycloalkyl, aryl, substituted aryl, alkaryl, substituted alkaryl, aralkyl, substituted aralkyl, or heterocyclic, and units of the structure:

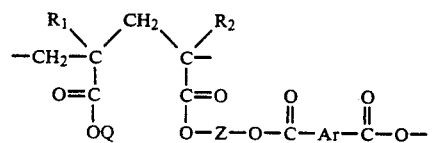

where Z is

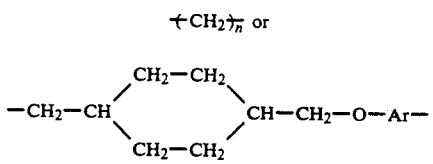

wherein n is 2 to 12, Ar is a benzene or naphthalene group, and Q is a cation of an alkali metal, such as sodium, potassium, and the like, alkaline earth, such as calcium and the like, tetrasubstituted ammonium, such as tetramethylammonium or dodecyltrimethylammonium and the like, or tetrasubstituted phosphonium, such as benzyltrimethylphosphonium.

The graft copolymer so formed by the catalyzed reaction may be further described as a polyester-grafted poly(glutarimide) ionomer, wherein the ionomer contains from about 0.0025 to about 0.25 millimoles of ionomeric groups per gram of polymer, depending on the extent of catalysis employed.

The catalysts employed will be used at levels of from about 10 to about 10,000 parts per million parts of total polymer present, and will be chosen from a base such as hydroxides, oxides, or weak organic acid anions, such as acetate, whose counterion is an alkali metal, such as sodium, potassium, and the like, alkaline earth, such as calcium and the like, tetrasubstituted ammonium, such as tetramethylammonium or dodecyltrimethylammonium and the like, or tetrasubstituted phosphonium cations, such as benzyltrimethylphosphonium. There are known other catalysts for esterification or transesterification, such as strong acids, such as sulfuric acid, sulfonic acids, sulfonated ion-exchange beads, and the like, tin derivatives, such as tin esters, alkaline earth salts of inorganic acids, such as magnesium sulphate, magnesium phosphate, calcium phosphite, and the like, titanium derivatives, such as titanium tetralkoxides, which may also be effective in improving the yield of graft copolymer.

The polyester will contain arylene or alkarylene units, such as phenylene, tolylene, naphthalylene, and the like, including biphenylene and units derived from diphenyl oxide, diphenyl sulfide, diphenylisopropylidene, and the like. The arylene or alkarylene may be the "alcohol" part of the polyester, that is, the oxygen atom of the ester group may be directly attached to the arylene ring. However, the preferred polyesters will have the carbonyl atom of the ester attached to the phenylene ring, such as in polyesters derived from terephthalic acid.

The free hydroxy groups in the polyester may be phenolic, but are preferably primary hydroxyl, such as end groups left from the condensation of ethylene glycol, 1,4-butylene glycol, cyclohexanedimethanol, and the like, with terephthalic acid, isophthalic acid, naphthalene-2,6-dicarboxylic acid, and the like. Similar terminal alcohol groups may be present when the polyester is made by the transesterification of such dialcohols with an ester of such acids, such as with dimethyl terephthalate and the like.

The polyester employed may be crystalline or crystallizable. The extent of crystallization or the rapidity with which is crystallizes may be affected by formation of the ionomer. The preferred polyesters to form the ionomers of the present invention are polyesters formed predominately of units derived from ethylene or 1,4-butylene glycol and terephthalic acid. The ratio of polyester to polyglutarimide reacted together to form ionomer may be from about 5:95 to about 95:5.

The preferred polyglutarimides contain units with the glutarimide ring structure shown above wherein $R_1$ and $R_2$ methyl, and $R_3$ is an alkyl group of from one to eight carbon atoms or a cyclohexyl group of from three to eight carbon atoms. Especially preferred are the polymers where $R_3$ is hydrogen or methyl.

When the polyglutarimide contains greater than about 0.5 weight percent acid and/or anhydride, such as about 5 weight percent, the extent of grafting without catalyst is extensive, such about 50% or higher. However, even small amounts of basic catalyst, such as sodium hydroxide at about 100 to about 1000 parts per million of the polyglutarimide, will increase the extent of grafting by significant amounts.

Surprisingly, even when the amount of unreacted acid/anhydride is reduced to below about 0.5 weight percent, and where no grafting is detected in the absence of catalyst, appreciable yields of ionomeric graft copolymer can be prepared with these same low levels of catalyst. Thus, it is possible to utilize polyglutarimides whose acid/anhydride contant has been almost totally reduced, only partially reduced, or not reacted at all to reduce such content.

Even with catalysis of the grafting reaction, complete reaction of every polyester chain with every polyglutarimide chain is unlikely, and there will be come free (ungrafted) polyester and/or some free (unreacted) polyglutarimide present. In some cases, the ungrafted polymer can be removed, leaving the purified ionomer. In other cases, separation is impossible or impractical, and the resulting product is a blend of the ionomer with ungrafted polyester and/or ungrafted polyglutarimide. The level of graft copolymer in such a blend may range from about 5 to about 90%, depending on the initial stoichiometry, the extent of reaction, and other reaction parameters. It is preferred that the polyester grafted polyglutarimide ionomer be from about 30 to about 90 weight percent of the blend, and more preferred that it be about 40 to about 80 weight percent of the blend, these being levels most readily achieved.

The reaction of the polyester with the glutarimide may be carried in the melt or in solution, although there are few solvents for crystalline polyesters which might not be expected to be deleterious to polyglutarimides. In the melt, the reaction may be carried out in any of a variety of reactors, such as a stirred kettle, but it is preferred to run the reaction in an extruder, where the polymer blend (with catalyst) may be fed, mixed, plasticated with heat and shear, further reacted with good mixing, devolatilized and extruded into pellets suitable for molding.

The temperature of reaction may be from about 240° to about 350° C., with about 260° to about 325° C., and especially about 275° C. preferred.

The polyglutarimide may be formed from a homopolymer or copolymer of a poly(methacrylate) ester or a poly(methacrylic acid); it may also be formed from a polymethacrylate which is part of a core/shell polymer or s segmented copolymer, such as a graft or block copolymer having also polyolefin segments.

The properties of either the pure graft copolymer or of its admixture with ungrafted polyglutarimide and/or unreacted polyester may be enhanced by the presence of one or more polymeric impact modifiers. Such impact modifiers for polyglutarimides and for polyesters are known to the art. Preferred are core-shell impact-strength modifiers, such as those where the impact-strength modifier has a core of rubbery polymer comprising primarily units derived from polymerization of monomers selected from the group consisting of butadiene and alkyl acrylates having from three to eight carbon atoms in the alkyl group, and grafted thereto one or more shells comprising a majority of units derived from polymerization of monomers selected from the group consisting of vinylaromatic, alkyl methacrylate and cycloalkyl methacrylate. Small amounts of monomers providing acid or anhydride functionality, such as methacrylic acid, acryloxypropionic acid, and maleic anhydride, may be copolymerized when forming the shell polymer.

The graft copolymer ionomers of the present invention, either as separated entities or as blends with poly(glutarimides) and polyesters, are useful in many areas. They will usually exhibit improved melt strength and resistance to sag, allowing thermoforming and blowing operations not always readily carried with the polyester alone. The blends will have good resistance to a variety of solvents, and will exhibit good resistance to loss of mechanical properties in the presence of heat. Thus, they may be useful in thermoforming, molding, film-forming, blow-molding, and other operations for the formation of packages, bottles, films, tie-layers in multi-layer structures, molded articles, such as housings for electronic equipment, automotive parts, and the like. In many of the latter applications, the availability of the polyglutarimide portion to accept reinforcement with glass, such as glass fibers or spheres, other fibers, such as carbon fibers, titania, talc, mica, and the like, makes the blend useful in filled applications.

The graft copolymer ionomers, either as separated entities or or admixtures with ungrafted polyglutarimide and polyester, may also be useful in blending other less compatible thermoplastics, especially those commonly considered "polar" in nature. Thus the graft copolymers of this invention and their blends with ungrafted polyester and ungrafted polyglutarimide, may be further blended with other thermoplastic polymers (as used herein "—" indicates blended polymers, "/" copolymers, and "//" graft or block polymers) such as butadiene/styrene/(meth)acrylic, styrene/(meth)acrylic, and (meth)acrylic multistage polymers; butadiene/styrene rubbers, ethylene/propylene/diene rubbers, polyamides, polyamide-multistage polymer blends, ethylene/vinyl acetate, styrene/acrylonitrile, styrene/acrylonitrile-multistage polymer blends, styrene/acrylonitrile-ethylene/propylene/diene rubber blends, alpha-methylstyrene/acrylonitrile, alpha-methylstyrene/styrene/acrylonitrile, alpha-methylstyrene/methyl methacrylate/ethyl acrylate, butadiene//acrylonitrile/styrene, polycarbonate, polycarbonate-multistage polymer blends; other polyesters, such as polybutylene terephthlate, polybutylene terephthalate-polycarbonate blends, polybutylene terephthalate-multistage polymer blends, polybutylene terephthalate/polytetrahydrofuran, polyethylene terephthalate or other polyalkylene terephthalate, polyethylene terephthalate-glycol modified, polyethylene terephthalate-polycarbonate blends, or polycaprolactone; polyarylate, polyvinyl chloride, polyvinyl chloride-multistage polymer blends, polyvinyl chloride-(meth)acrylate blends, chlorinated polyvinyl chloride, acrylonitrile/(meth)acrylate-multistage polymer blends, acrylonitrile/(meth)acrylate/styrene, epichlorohydrin/bis-phenol-A, copolyester of bisphenol-A with isophthalic and/or terephthalic acids, poly(meth)acrylates, polyacetal, polystyrene, high-impact polystyrene, styrene/maleic anhydride, styrene/maleimide, polyolefins, polyvinylidene fluoride, polyvinylidene fluoride-multistage polymer blends, cellulosics, polyethylene oxide, polyamideimide, polyetherester, polyetheresteramide and polyetheramide. Blends having modified performance characteristics can be prepared from many other polymer systems with the graft copolymers. These include polyphenylene sulfide, polyphenylene oxide, polysulfone, polyphenylene oxide-polystyrene blends, polyphenylene oxide-high impact polystrene blends, polyvinylidene chloride, polyvinylidene chloride/(meth)acrylonitrile, polyvinylidene chloride/(meth)acrylate, polyvinyl alcohol, polyvinyl acetate, polyetheretherketone, polyetherimide, thermoplastic polyimides, and other polymer types, Random or block copolymers which combine the different functionalities can also be used, and ternary or higher blends can be made from combinations of any of these polymer types with the imide polymers. The graft polymers and blends with other polymer systems can be further modified by the incorporation of glass or other fibers, or particulate fillers or reinforcing agents such as talc or other minerals, glass spheres, or metallic particles. In general, the imide components of the graft copolymers exhibit good adhesion to glass and other inorganic fillers. Further modification of properties of the polyimides and blends can be obtained by incorporating additives such as flame retardants, blowing agents, antioxidants, thermal stabilizers, pigments, flatting agents, lubricants, antistatic agents, conductive materials, toners or UV stabilizers.

The blends, with or without additives, may also be combined with one or more of the impact modifiers disclosed above as being useful in modification of the ionomeric polymers. A preferred combination is that of a poly(ethylene terephthalate) grafted poly(N-methyl dimethylglutarimide) ionomer, a polycarbonate, such as bis-phenol A polycarbonate, and a core//shell impact modifier, such as a modifier containing a core of a poly-butadiene or a poly(alkyl acrylate) and a shell of a poly-(alkyl methacrylate). Such combinations exhibit a useful combination of toughness, a lack of notch sensitivity, and retention of impact strength on thermal aging. The blend may further contain ungrafted poly(glutarimide) and ungrafted polyester.

EXAMPLES 1-5

Preparation of Grafted Copolymers

These examples described the preparation of grafted copolymers from o copolymer (A) containing (N-methyldimethylgutarimide) units and units derived from methyl methacrylate, methacrylic acid, and methacrylic anhydride units and a polyester (B) containing mainly units derived from ethylene glycol and terephthalic acid, commercially known as Carodel (R) 5237, and believed also to contain a low percentages of units derived from isophthalic acid. For convenience, PET will be used to refer to all such polymers, and PET-1 for this specific material. The reactions were run with and without a basic catalyst. The use of a basic catalyst gives rise to a more highly grafted polymer which also contains ionomeric groups on the polymer backbone.

Prior to extrusion, a 50/50 mixture of glutarimide copolymer and polyester was prepared as described above. The polyglutarimide in this series, which will be identified as PGI-1, contained about 76 weight percent of units of the N-methyldimethylglutarimide structure and total of about 5 weight percent of units derived from methacrylic acid and methacrylic anhydride. When catalysis was utilized, prior to blending, the polyglutarimide pellets were coated with NaOH in a rotary evaporator to give a 1000 PPM NaOH-on-glutarimide concentrate which was let down with virgin glutarimide to the desired PPM NaOH level. The PPM of catalyst is based on the total amount of polyglutarimide and polyester present.

The mixture was fed, at a rate of 80.0 g/min, into a 62.5-L/D (length/diameter), 2.0-cm Welding Engineers twin-screw, counter-rotating extruder (obtained from Welding Engineers, Inc., Blue Bell, Pa.) operating at a screw speed of 500 ppm, with the reaction zone set to a temperature of 275° C. The extruder had three vents, all run under full vacuum. Samples were extruded as strands and cut into pellets prior to molding or analysis for grafting.

The blends of PET-1, PGI-1 and PET-grafted-Imide polymer-ionomer or non-ionomeric PET-poly(glutarimide) copolymer (without NaOH) were analyzed for extent of grafting by the following method:

A 0.100 gram sample of the reaction mixture containing polyimide-graft-polyester ionomer and also ungrafted polyglutarimide and polyester (poly(ethylene terephthalate), PET) is dissolved in 10.0 grams of 95:5 phenol/methanol with heating to 50° C. in a tared centrifuge tube equipped with a small star magnet. After dissolution, a 10.0 grams aliquot of acetone is slowly added to the centrifuge vial tube under rapid stirring to precipitate the Imide-graft-PET and homo-PET (ungrafted) polymer (Fraction "A"). The sample is then centrifuged for one hour at 10,000 rpm. A solid plug should form and the clear solvent should be carefully decanted or pipetted away from the polymer plug. The acetone/phenol/methanol solution is saved and labeled as the polyglutarimide polymer solution (Fraction "B").

Another 20.0 cc (15.8 grams) of acetone is added to the centrifuge vial and the polymer plug and re-centrifuged for 15 minutes at 10,000 rpm. The solvent is then removed and added to the Fraction B solution. The centrifuge vial containing the Imide-graft-PET polymer plug (Fraction A) is then weighed after drying at 120° C. for 20 hours. The % Imide grafted to PET (% I-g-PET) is calculated from the initial weight of the sample, the known starting sample composition, and the Fraction A weight. The % ungrafted Imide (% un-g-I) is then calculated by difference from 100 % − % recovery of fraction "A".

Data in Tables IV and V was obtained by use of larger samples and filtration rather than centrifugation, to separate the fractions.

Subsequent spectroscopic analysis of fractions "A" reveal it to contain almost all of the PET, both grafted and ungrafted, whereas fraction "B", containing the ungrafted poly(glutarimide), contains almost no PET. Infrared spectra were obtained on cast films (on KBr) from 2% phenol solution for the fraction "A" samples, and from 2% tetrahydrofuran solutions for the fraction "B" samples. The % grafting levels could also be confirmed from the ratio of acrylic to aromatic ester peaks in the IR spectra of the fraction "A" samples.

The fractionation results are shown in Table 1, and the physical properties in Table 2. DTUFL (heat distortion temperature under full load) is measured at 264 psi (1819 kPa). Tensile elongation at failure and at break is measured as a percentage of original specimen length; if one on value is seen, there is no yielding prior to break. Tensile strength and tensile modulus are in kPa units. All are measured by standard ASTM test procedures.

TABLE I
DATA FOR 50/50 - PGI-1/PET-1

| EXAMPLE | PPM NaOH | % graft copolymer in blend |
|---|---|---|
| 1 | 0 | 51 |
| 2 | 125 | 58 |
| 3 | 250 | 61 |
| 4 | 500 | 71 |
| 5 | 1000 | 91 |

TABLE II
PROPERTIES OF 50/50 PET-1/PGI-1 BLENDS

| EXAMPLE | DTUFL @ 1819 kPa | TENS % E | STRENGTH | MODULUS |
|---|---|---|---|---|
| 1 | 115° C. | 1.50 | 41,620 | 3,121,000 |
| 2 | 99° C. | 2.26 | 56,250 | 3,066,000 |
| 3 | 99° C. | 1.98 | 51,470 | 3,038,000 |
| 4 | 98° C. | 1.68 | 45,200 | 3,025,000 |
| 5 | 103° C. | 1.69 | 44,370 | 3,183,000 |

Although the more highly-grafted copolymers of the present invention have somewhat lower heat-distortion temperatures, as predicted for more miscible blends, the improvement in elongation, tensile strength and modulus are significant of tougher, yet more rigid material.

EXAMPLES 6-17

Blends Containing PET-1

In a similar manner, blends were made with PET-1 with several other polymers containing predominantly units of N-methyldimethylglutarimide. All glutarimide polymers were of MW ca. 150,000, PGI-2 was similar to PGI-1, except the content of imide groups was ca. 86 weight percent. PGI-3 was a polymer prepared from PGI-1 by removal of most of the acid/anhydride groups by reaction with dimethyl carbonate as described in U.S. Pat. No. 4,727,117, incorporated by reference. PGI-4 similarly is PGI-2 of acid/anhydride content below 0.5%. All blends in this series are 1/1 by weight of the polyester and polyglutarimide; processing was as in Example 1.

TABLE III
DATA FOR 50/50 - PET-1/PGI-2

| Example | PPM NaOH/ % I-g-PET | DTUFL @ 1819 kPa | TENS % E | STRENGTH | MODULUS |
|---|---|---|---|---|---|
| 6 (control) | 0/94% | | COULDN'T MOLD | | |
| 7 | 125/100% | | COULDN'T MOLD | | |
| 8 | 250/100% | | COULDN'T MOLD | | |
| 9 | 500/99% | | COULDN'T MOLD | | |

In these examples, apparently the extent of grafting led to a material of high melt viscosity and poor flow which could not be molded.

TABLE IV
DATA FOR 50/50 - PET-1/PGI-3

| EXAMPLE | PPM NaOH/ % I-g-PET | DTUFL @ 1819 kPa | % Graft TENS % E | STRENGTH | MODULUS |
|---|---|---|---|---|---|
| 10 (control) | 0/ca 0% | 75° C. | 4.1/5.1 | 68,830 | 2,192,000 |
| 11 | 125/17% | 98° C. | 4.2/33 | 69,940 | 2,887,000 |
| 12 | 250/19% | 111° C. | 4.1/36 | 70,070 | 2,990,000 |

TABLE IV-continued

| | DATA FOR 50/50 - PET-1/PGI-3 | | | | |
|---|---|---|---|---|---|
| EXAMPLE | PPM NaOH/ % I-g-PET | DTUFL @ 1819 kPa | % Graft TENS % E | STRENGTH | MODULUS |
| 13 | 500/20% | 109° C. | 4.2/6.7 | 71,590 | 3,011,000 |

These examples illustrate that some grafting occurs even with a glutarimide polymer of low acid/anhydride content when catalysis is employed. Here the improvement over the control in DTUFL is quite noticeable, especially in improvement in elongation prior to break.

TABLE V

| | DATA FOR 50/50 - PGI-4/PET-1 | | | | |
|---|---|---|---|---|---|
| SAMPLE NUMBER | PPM NaOH/ % I-g-PET | DTUFL @ 1819 kPa | TENS % E | STRENGTH | MODULUS |
| 14 (control) | 0/ca 0.4% | 81° C. | 4.2/20 | 68,620 | 2,880,000 |
| 15 | 125/ca 0.0% | 124° C. | 4.0/18 | 67,800 | 2,825,000 |
| 16 | 250/ca 7.8% | 119° C. | 4.1/18 | 67,700 | 2,832,000 |
| 17 | 500/ca 8.8% | 120° C. | 4.1/8.5 | 69,100 | 2,928,000 |

Here the major effect seen was in an improvement in the DTUFL values.

EXAMPLES 18–27

Blends of Polyester-Polyglutarimide Ionomers Further Containing Polycarbonate and a Core/Shells Impact Modifier In these examples, blends of PGI-1, a poly(ethylene terephthalate) commercially sold as Carodel (R) 5122C (PET-2), a commercial bis-phenol A polycarbonate molding resin (Merlon M-50), designated PC-1, and a commercial core//shell acrylic impact modifier (Paraloid (R) EXL-3330), designated IM-1, were combined with and without basic catalyst. IM-1 is a core//shell impact modifier of 80 poly(butyl acrylate)// 20 poly(methyl methacrylate).

In the blends, the amount of IM-1 was held constant at 30 parts/100 parts of all polymers, and the amount of PC-1 was held constant at 20 parts/100 parts (PHR) of all polymers. Only the amounts of PGI-1 and PET-2 were varied.

In the catalyzed blends, sodium hydroxide was introduced as in Examples 1–5 and let down to give a concentration of 125 ppm based on total polymer present. All blends were prepared as in Examples 1–5, followed by melt-mixing and extruding from a 25.4 mm. Killion single-screw extruder at a melt temperature of 250° C. and a screw speed of 100 RPM. Izod impacts are measured by standard ASTM tests and are reported in Joules/meter.

The data show an improvement in impact for all members of the series when the catalyst is employed, but a much larger proportional increase when both polyester and polyglutarimide are present in the catalyzed mixture.

TABLE VI

| | DATA FOR PGI-1/PET-2/PC-1/IM-1 BLENDS | | |
|---|---|---|---|
| EXPL | NaOH? | PGI-1/PET-2.PHR | IZOD.J/m |
| 18 | N | 50/0 | 287 |
| 19 | N | 40/10 | 376(a) |
| 20 | N | 25/25 | 450(b) |
| 21 | N | 10/40 | 550(b) |
| 22 | N | 0/50 | 774 |
| 23 | Y | 50/0 | 410 |
| 24 | Y | 40/10 | 584(a) |

TABLE VI-continued

| | DATA FOR PGI-1/PET-2/PC-1/IM-1 BLENDS | | |
|---|---|---|---|
| EXPL | NaOH? | PGI-1/PET-2.PHR | IZOD.J/m |
| 25 | Y | 25/25 | 774(b) |
| 26 | Y | 10/40 | 860(b) |
| 27 | Y | 0/50 | 897 |

Notes: (a)some ductile breaks (Izod bar is hinged after impact, not broken into two pieces); (b)all ductile breaks.

I claim:

1. A polymer blend comprising an ungrafted polyester, an ungrafted poly(glutarimide) and a polyester-grafted poly(glutarimide) ionomer, the ionomer containing units of the structures;

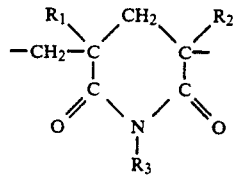

wherein R$_1$ and R$_2$ are H or CH$_3$, is H, alkyl substituted alkyl, cycloalkyl, substituted cycloalkyl, aryl, substituted aryl, alkaryl, substituted alkaryl, aralkyl, substituted aralkyl, or heterocyclic; and

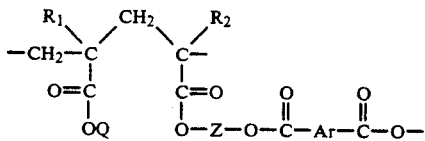

wherein Z is

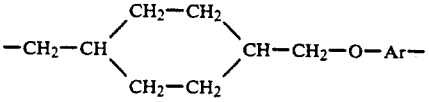

n is 2 to 12, Ar is an arylene or alkarylene group, and Q is a cation of an alkali metal or an alkaline earth metal.

2. The blend of claim 1 wherein the polyester-grafted poly(glutarimide) ionomer is present at from about 5 to about 99% of the blend.

3. The blend of claim 1 wherein the polyester-grafted poly(glutarimide) ionomer is present at from about 30 to about 90% of the blend.

4. The blend of claim 1 wherein the polyester-grafted poly(glutarimide) ionomer is present at from about 40 to about 80% of the blend.

5. The blend of claim 1 wherein the poly(glutarimide) is a poly(N-alkyldimethylglutarimide) and the poly(glutarimide) portion of the polyester-grafted poly(glutarimide) ionomer contains units of N-alkyldimethylglutarimide.

6. The blend of claim 1 wherein the ungrafted polyester and the polyester portion of the polyester-grafted poly(glutarimide) ionomer contain one or more of arylene or alkarylene repeating units and the polyester contains one or more terminal hydroxyl groups.

7. The blend of claim 6 wherein the ungrafted polyester is crystalline.

8. The blend of claim 6 wherein the polyester and the polyester portion of the polyester-grafted poly(glutarimide) ionomer are poly(ethylene terephthalate) or poly(butylene terephthalate).

9. The blend of claim 1 additionally containing a polymeric impact-strength modifier.

10. The blend of claim 9 wherein the impact-strength modifier is a core-shell impact-strength modifier.

11. The blend of claim 10 wherein the impact-strength modifier has a core of rubber polymer comprising primarily units derived from polymerization of monomers selected from the group consisting of butadiene and alkyl acrylates having from three to eight carbon atoms in the alkyl group, and grafted thereto one or more shells comprising a majority of units derived from polymerization of monomers selected from the group consisting of vinylaromatic, alkyl methacrylate and cycloalkyl methacrylate.

12. An article prepared from any of the blends of claim 1, 9, or 10.

13. The blend of claims 1 or 9 containing additional additives selected from at least one of the group consisting of antioxidants, heat stabilizers, ultraviolet-light stabilizers, lubricants, colorants, mold-release agents, flame retardants, fibers, and fillers.

14. The blend of claims 1 or 9, further containing at least one other matrix polymer.

15. The blend of claim 14 wherein the at least one other matrix polymer is polycarbonate, the polyglutarimide is poly(N-methyldimethylglutarimide), the polyester is poly(ethylene terephthalate), and the impact modifier has a core of rubbery polymer comprising primarily units derived from polymerization of monomers selected from the group consisting of butadiene and alkyl acrylates having from three to eight carbon atoms in the alkyl group, and grafted thereto one or more shells comprising a majority of units derived from polymerization of methyl methacrylate.

16. An article prepared from the blend of claim 14.

* * * * *